United States Patent
Lee et al.

(10) Patent No.: US 11,349,330 B2
(45) Date of Patent: May 31, 2022

(54) ELECTRONIC DEVICE FOR CHARGING BATTERIES OF A PLURALITY OF PORTIONS

(71) Applicant: Samsung Electronics Co., Ltd., Gyeonggi-do (KR)

(72) Inventors: Woochul Lee, Gyeonggi-do (KR); Eunsu Jeong, Gyeonggi-do (KR); Byunghun Cho, Gyeonggi-do (KR); Mihyun Jeong, Gyeonggi-do (KR); Minsung Jung, Gyeonggi-do (KR); Woocheol Jung, Gyeonggi-do (KR); Jaewoong Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/669,046

(22) Filed: Oct. 30, 2019

(65) Prior Publication Data

US 2020/0136422 A1 Apr. 30, 2020

(30) Foreign Application Priority Data

Oct. 31, 2018 (KR) .................. 10-2018-0131687

(51) Int. Cl.
*H02J 7/00* (2006.01)
*H02J 7/02* (2016.01)
(Continued)

(52) U.S. Cl.
CPC .............. *H02J 7/025* (2013.01); *H02J 7/027* (2013.01); *H02J 50/10* (2016.02); *H02J 50/80* (2016.02)

(58) Field of Classification Search
USPC .................................................. 320/106–115
See application file for complete search history.

(56) References Cited

U.S. PATENT DOCUMENTS 9,860,358 B2 1/2018 Park et al.
2013/0043738 A1 2/2013 Park et al.
(Continued)

FOREIGN PATENT DOCUMENTS

KR 10-1844283 B1 4/2018

OTHER PUBLICATIONS

International Search Report dated Feb. 26, 2020.
European Search Report dated Oct. 13, 2021.

*Primary Examiner* — Binh C Tat
(74) *Attorney, Agent, or Firm* — Cha & Reiter, LLC

(57) ABSTRACT

A first electronic device is provided. The first electronic device, comprises $_{[MD2]}$ a first communication module, a first battery configured to supply power to the first electronic device, a first power management module connected and configured to control the first battery, a first power transfer module, and a first processor operationally connected with the first communication module, the first power management module, and the first power transfer module, wherein the first communication module is configured to identify a remaining capacity of a second battery in the second electronic device, and wherein the first processor is configured to, when a remaining capacity of the first battery is greater than the remaining capacity of the second battery by greater than or equal to a specified threshold value, transfer at least a portion of the power of the first battery to the second electronic device using the first power transfer module.

18 Claims, 14 Drawing Sheets

(51) Int. Cl.
*H02J 50/10* (2016.01)
*H02J 50/80* (2016.01)

(56) References Cited

U.S. PATENT DOCUMENTS

| | | |
|---|---|---|
| 2014/0001875 A1 | 1/2014 | Nahidipour |
| 2014/0055098 A1 | 2/2014 | Lee |
| 2014/0285134 A1 | 9/2014 | Kim et al. |
| 2014/0306649 A1 | 10/2014 | Akiyoshi et al. |
| 2015/0188339 A1 | 7/2015 | Green et al. |
| 2016/0164336 A1 | 6/2016 | Akiyoshi et al. |
| 2017/0025887 A1* | 1/2017 | Hyun .................. H02J 7/00714 |
| 2017/0054328 A1* | 2/2017 | Jung ....................... H02J 50/10 |
| 2018/0041622 A1 | 2/2018 | Park et al. |
| 2018/0364786 A1* | 12/2018 | de la Cropte de Chanterac ......... G06F 1/206 |

* cited by examiner

ELECTRONIC DEVICE FOR CHARGING BATTERIES OF A PLURALITY OF PORTIONS

CROSS-REFERENCE TO RELATED APPLICATION(S)

This application is based on and claims priority under 35 U.S.C. § 119 to Korean Patent Application No. 10-2018-0131687, filed on Oct. 31, 2018, in the Korean Intellectual Property Office, the disclosure of which is incorporated by reference herein its entirety.

BACKGROUND

1. Field

The disclosure relates to technologies of charging a battery included in each of a plurality of portions in an electronic device having the plurality of portions.

2. Description of Related Art

An electronic device may be comprised of a plurality of portions. Each of the plurality of portions may have a battery. The batteries may be charged and discharged independently of each other. Each of the plurality of portions may independently operate in a wireless environment using the battery.

In general, it is necessary for a charging device, connected with an external power supply, for supplying electrical energy to the battery of each of the plurality of portions to charge the battery. The charging device and each of the plurality of batteries are equipped with a power transfer circuit such as an induction coil. The charging device may charge each of the batteries until each of the batteries is fully charged using the power transfer circuit.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, a first electronic device is provided. The first electronic device, comprises $_{[MD1]}$ first communication module, a first battery configured to supply power to the first electronic device, a first power management module connected and configured to control the first battery, a first power transfer module, and a first processor operationally connected with the first communication module, the first power management module, and the first power transfer module, wherein the first communication module is configured to identify a remaining capacity of a second battery in the second electronic device, and wherein the first processor is configured to, when a remaining capacity of the first battery is greater than the remaining capacity of the second battery by greater than or equal to a specified threshold value, transfer at least a portion of the power of the first battery to the second electronic device using the first power transfer module.

In accordance with another aspect of the disclosure, a first electronic device is provided. The first electronic device, comprises a first communication module, a first battery configured to supply power to the first electronic device, a first power management module configured to control the first battery, a first power transfer module, and a first processor operationally connected with the first communication module, the first power management module, and the first power transfer module, wherein, when the first battery is fully charged, the first communication module is configured to identify a remaining capacity of a second battery in a second electronic device and the first processor is configured to transfer at least a portion of the power of the first battery to the second electronic device using the first power transfer module.

In accordance with another aspect of the disclosure, an apparatus is provided. The apparatus may include a first electronic device and a second electronic device detachably connected with at least a partial region of the first electronic device. The first electronic device may include a first combination member, a first coil, a first communication module, a first battery configured to supply power to the first electronic device, a first power transfer module configured to transfer at least a portion of the power of the first battery to the second portion, a first power reception module configured to receive power from the second electronic device and charge the first battery, and a first processor operationally connected with the first communication module, the first power reception module, and the first power transfer module. The second electronic device may include a second combination member, a second coil, a second communication module, a second battery configured to supply power to the second electronic device, a second power transfer module configured to transfer at least a portion of the power of the second battery to the first portion, a second power reception module configured to receive power from the first portion and charge the second battery, and a second processor operationally connected with the second communication module, the first power transfer module, and the second power reception module. The second electronic device may be combined with the at least partial region of the first portion using the first combination member and the second combination member, and the first coil and the second coil may be disposed adjacent to each other. The first processor or the second processor may be configured to identify a first level which is remaining capacity of the first battery and a second level which is remaining capacity of the second battery and, when a difference value between the first level and the second level is greater than or equal to a specified threshold value, transfer the at least portion of the power of the first battery to the second portion using the first power transfer module, the first coil, and the second coil or transfer the at least portion of the power of the second battery to the first portion using the first second transfer module, the first coil, and the second coil.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

An electronic device may use a battery of each of a plurality of portions without recognizing or identifying a battery level or a use time among the plurality of portions. Although there should be batteries respectively corresponding to the plurality of portions, the electronic device may operate. When a wired or wireless interface capable of transmitting and receiving information about battery remaining capacity is not provided among the plurality of portions, a battery included in any one portion among a plurality of batteries respectively included in a plurality of modules may first be discharged. Although there is the remaining capacity of each of other batteries, when one battery is fully discharged, it is unable to use the entire electronic device.

Aspects of the disclosure are to address at least the above-mentioned problems and/or disadvantages and to provide at least the advantages described below. Accordingly, an aspect of the disclosure is to provide an electronic device for addressing the above-mentioned problems and issues raised in the disclosure.

Figure 1:
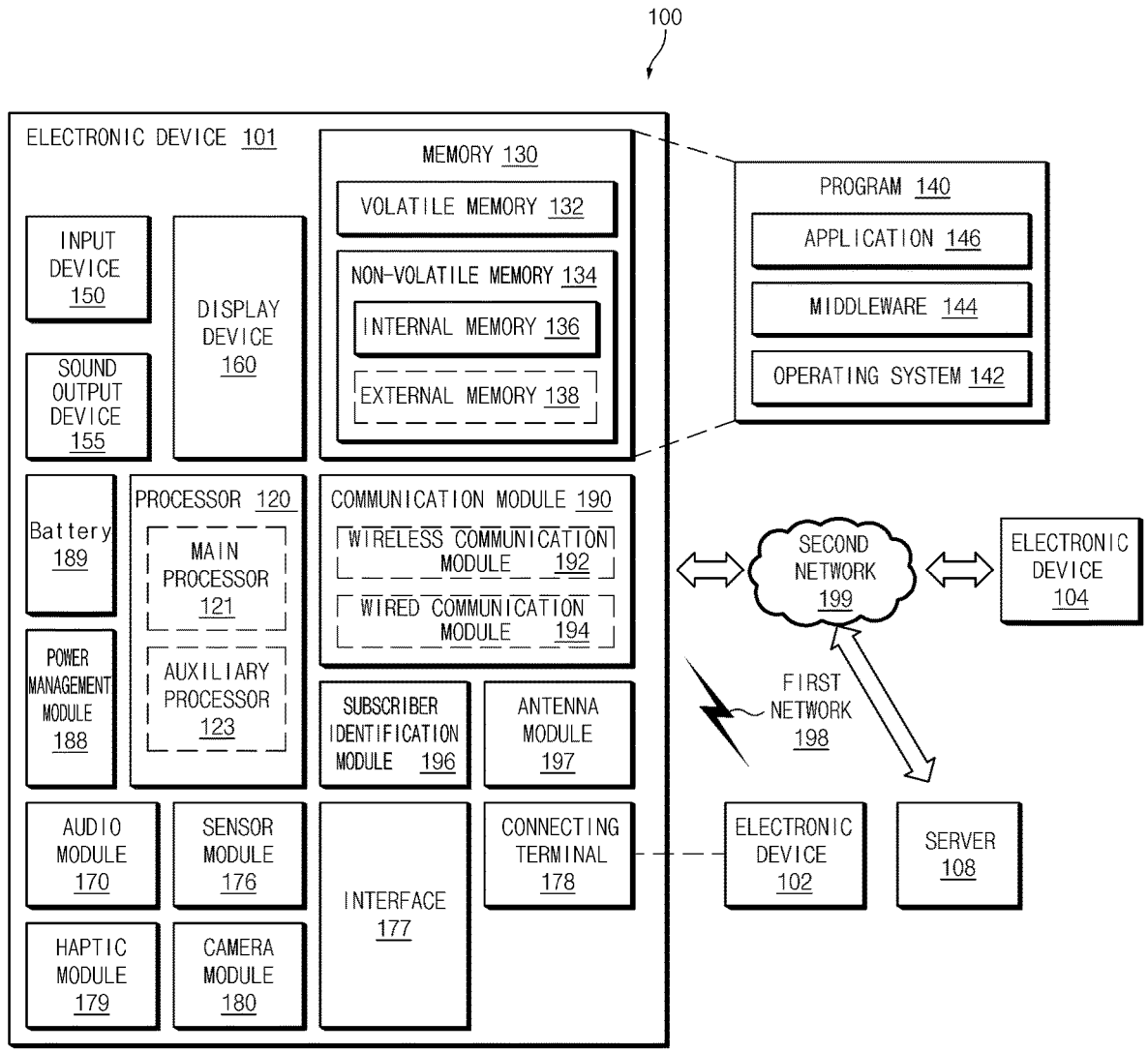
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
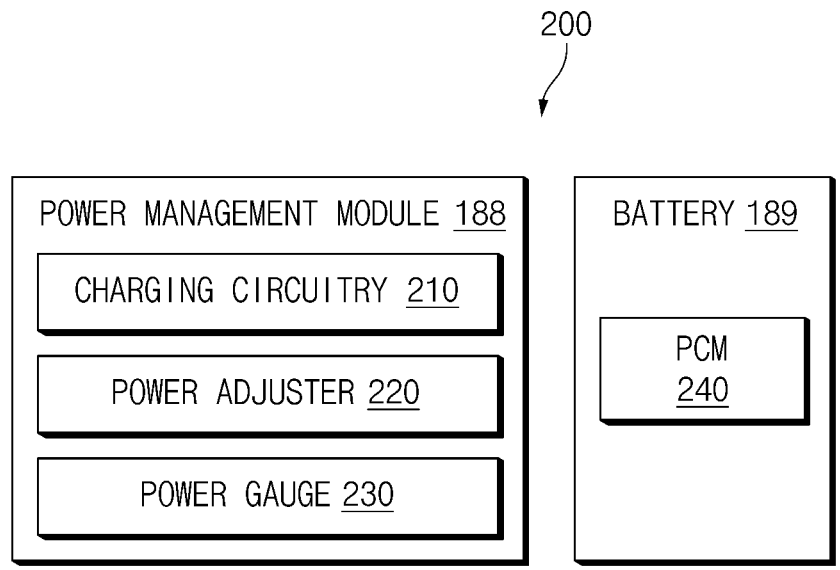
FIG. 2 is a block diagram illustrating the power management module and the battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
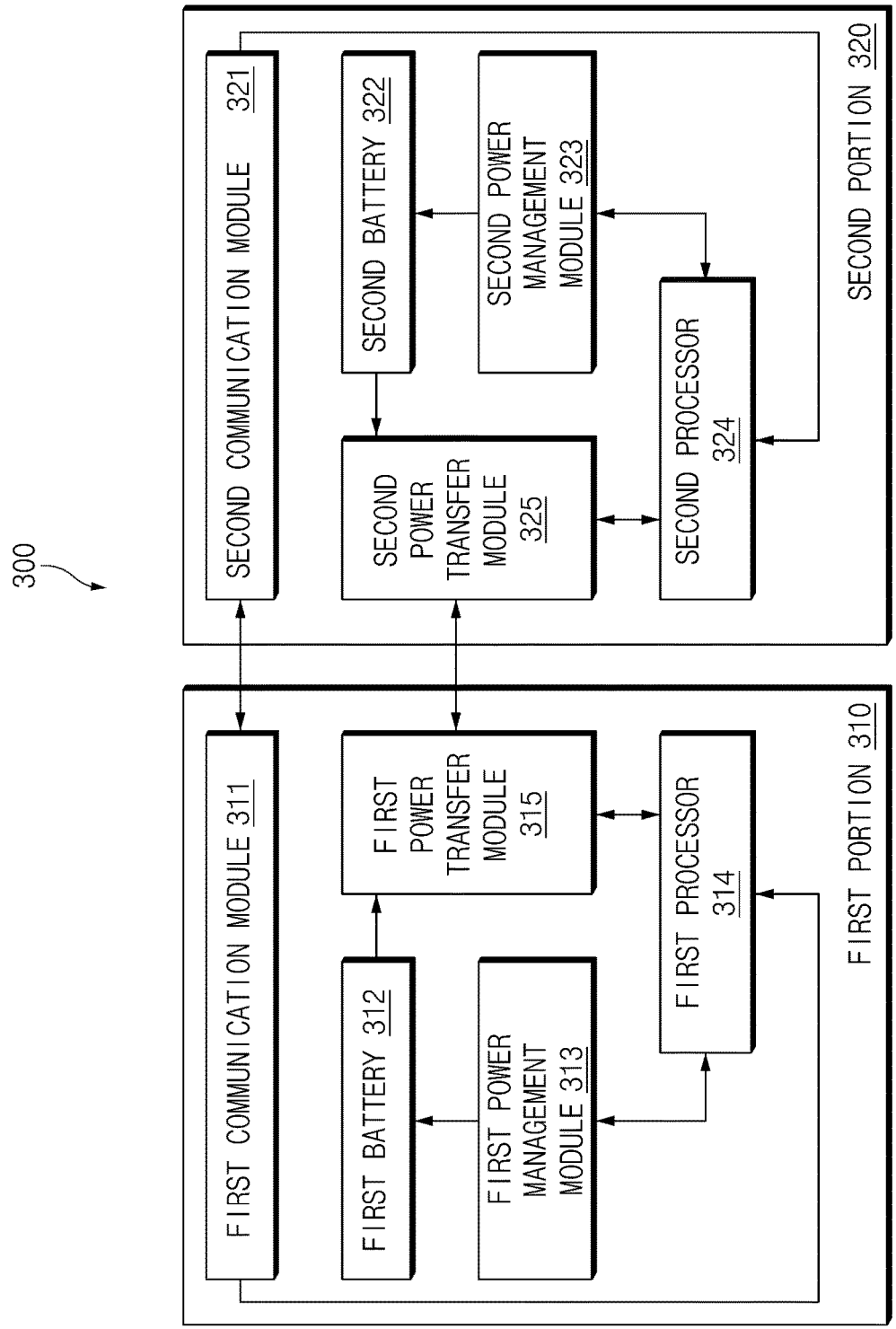
FIG. 3 is a block diagram illustrating a first portion and a second portion of an electronic device according to an embodiment.

FIG. 3 is a block diagram illustrating a first electronic device 310 and a second electronic device 320 of an apparatus 300 according to an embodiment.

In an embodiment, the apparatus 300 may include the first electronic device 310 and the second electronic device 320 capable of being detachably connected or separated from the first electronic device 310. The first electronic device 310 and the second electronic device 320 may correspond to at least some 310 and 320 of a plurality of portions included in the electronic device 300. Furthermore, each of the first electronic device 310 and the second electronic device 320 may include at least some of components constituting an electronic device 101, described with reference to FIG. 1. The apparatus 300 may be used or charged in a state where each of the plurality of portions is combined or separated.

In an embodiment, the first electronic device 310 may include a first communication module 311, a first battery 312, a first power management module 313, a first processor 314 (the term "processor" shall be understood to mean at least one processor), and a first power transfer module 315. The second electronic device 320 may include a second communication module 321, a second battery 322, a second power management module 323, a second processor 324, and a second power transfer module 325. Configurations and functions of the second communication module 321, the second battery 322, the second power management module 323, the second processor 324, and the second power transfer module 325 may be substantially the same as those of the first communication module 311, the first battery 312, the first power management module 313, the first processor 314, and the first power transfer module 315. Thus, hereinafter, a description will be given of the configurations and functions of the first communication module 311, the first battery 312, the first power management module 313, the first processor 314, and the first power transfer module 315, a duplicated description thereof will be omitted.

In an embodiment, the first communication module 311 may establish a wireless communication channel and may perform wireless communication using the established communication channel. For example, the first communication module 311 may perform wireless communication with the second communication module 321.

As an example, the first communication module 311 may communicate with the second communication module 321 of the second electronic device 320 in an out-band manner using an antenna or coil independent of a power transmission coil used for power delivery. In this case, as shown in FIG. 3, the first communication module 311 may have a physical structure independent of the first power transfer module 315. For example, the first communication module 311 may include a transceiver that uses any one of various short-range communication modes such as Bluetooth, wireless-fidelity (Wi-Fi), Bluetooth low energy (BLE), and near field communication (NFC). The second communication module 321 may also include a transceiver that uses any one of various short-range communication modes such as Bluetooth, wireless-fidelity (Wi-Fi), Bluetooth low energy (BLE), and near field communication (NFC).

As another example, the first communication module 311 may communicate with the second communication module 321 in an in-band manner using the power transmission coil. For example, the first communication module 311 may communicate with the second communication module 321 using a power transmission coil used for power delivery by the first power transfer module 315. In this case, unlike the configuration shown in FIG. 3, the first communication module 311 may be structurally included in the first power transfer module 315.

In an embodiment, the first communication module 311 may transmit information associated with the first electronic device 310. The first communication module 311 may receive information associated with the second electronic device 320 from the second communication module 321, or vice versa. The first communication module 311 may obtain information associated with a charging state (e.g., a charging speed, the average of the square root of an output voltage, intensity of an output current, or information indicating whether charging related abnormality occurs) from the second communication module 321. The first communication module 311 may transmit and receive information associated with the first battery 312 and the second battery 322 with the second communication module 321. For example, the first communication module 311 may transmit a remaining capacity of the first battery 312 (first level) to the second communication module 321 and may receive a remaining capacity of the second battery 322 (second level) from the second communication module 321.

In an embodiment, the first communication module 311 may be operationally connected with the first processor 314. Operation connection may include connection via a bus or direct connection. The first communication module 311 may deliver the received information to the first processor 314. For example, the first communication module 311 may deliver the second level which is the remaining capacity of the second battery 322, received from the second communication module 321, to the first processor 314.

In an embodiment, the first battery 312 may supply power to the first electronic device 310. The first battery 312 may be controlled by the first power management module 313. The first battery 312 may transfer at least a portion of its power to the first power transfer module 315.

In an embodiment, the first power management module 313 may control the first battery 312. The first power management module 313 may control a charging or power output operation of the first battery 312. The first power management module 313 may deliver the first level which is the remaining capacity of the first battery 312 to the first processor 314. The first power management module 313 may receive information associated with a driving state of the first electronic device 310 from the first processor 314. The first power management module 313 may analyze a power supply state of the first electronic device 310. The first power management module 313 may set the amount or distribution of power supplied to the first electronic device 310 by the first battery 312.

In an embodiment, the first processor 314 may be operationally connected with the first communication module 311, the first power management module 313, and the first power transfer module 315. The first processor 314 may control to drive the first electronic device 310. The first processor 314 may compare the transmitted first level with the transmitted second level. The first processor 314 may be configured such that the first power management module 313 controls a power output of the first battery 312 based on the transmitted first and second levels. The first processor 314 may control whether to operate the first power transfer module 315, based on the transmitted first and second levels.

In an embodiment, the first power transfer module 315 may be connected with the first battery 312 and the first processor 314. The first power transfer module 315 may be selectively operated under control of the first processor 314. The first power transfer module 315 may transfer at least a portion of the power of the first battery 312 to the second portion 310. For example, the first power transfer module 315 may transfer at least a portion of the power of the first battery 312 to the second power transfer module 325. The first power transfer module 315 may include a power transmission coil which transmits power to the outside. Furthermore, the first power transfer module 315 may further include a power reception coil capable of receiving power from the outside. The first power transfer module 315 may receive at least a portion of the power of the second battery 322 from the second power transfer module 325. The power transmission coil and the power reception coil of the first power transfer module 315 may be implemented as a single coil or separate coils.

In an embodiment, when a difference value between the first level and the second level is greater than or equal to a specified threshold value, the first processor 314 or the second processor 324 may be configured to transfer at least a portion of the power of the first battery 312 to the second electronic device 320 using the first power transfer module 315 or transfer at least a portion of the power of the second battery 322 to the first electronic device 310 to the first electronic device 310 using the second power transfer module 325. For example, the first processor 314 or the second processor 324 may be configured to, when the difference value between the first level and the second level is greater than or equal to the specified threshold value, reduce the difference value between the first level and the second level.

Figure 4:
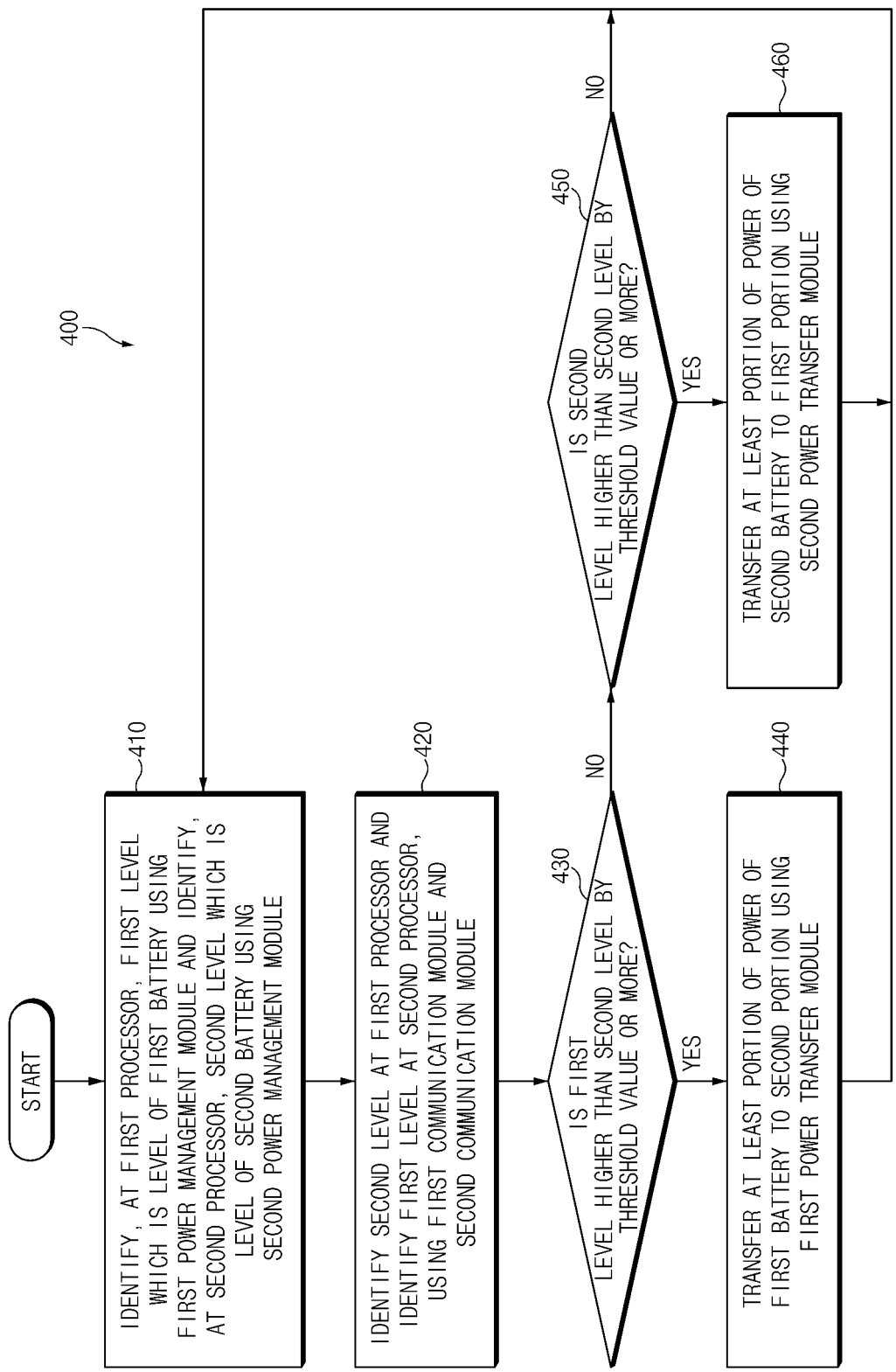
FIG. 4 is a flowchart illustrating a method for balancing a battery level between a first portion and a second portion of an electronic device according to an embodiment.

FIG. 4 is a flowchart 400 illustrating a method for balancing a battery level between a first electronic device 310 and a second electronic device 320 of an electronic device 300 according to an embodiment.

In the electronic device 300 according to an embodiment, in operation 410, a first processor 314 of FIG. 3 may identify a first level which is a level of a first battery 312 of FIG. 3 using a first power management module 313 of FIG. 3 and a second processor 324 of FIG. 3 may identify a second level which is a level of a second battery 322 of FIG. 3 using a second power management module 323 of FIG. 3. For example, at a specified time interval while the electronic device 300 is driven or charged, the first processor 314 may identify the batter remaining capacity of a first electronic device 310 of FIG. 3 and the second processor 324 may identify the battery remaining capacity of a second electronic device 320 of FIG. 3.

In the electronic device 300 according to an embodiment, in operation 420, the first processor 314 may identify the second level and the second processor 324 may identify the first level, using a first communication module 311 and a second communication module 321 of FIG. 3. For example, the first communication module 311 and the second communication module 321 may perform wireless communication at a specified time interval while the electronic device 300 is driven or charged. The first communication module 311 may deliver the first level to the second communication module 321, and the second communication module 321 may deliver the second level to the first communication module 311. The first processor 314 may receive the second level from the first communication module 311 to identify the battery remaining capacity of the second electronic device 320, and the second processor 324 may receive the first level from the second communication module 321 to identify the battery remaining capacity of the first electronic device 310.

In an embodiment, in operation 420, the first processor 314 or the second processor 324 may determine a power transfer direction. For example, when the first electronic device 310 is set as a master and when the second electronic device 320 is set as a slave, the first communication module 311 may receive the second level from the second communication module 321. The first processor 314 may compare the first level with the second level and may determine a power transfer direction between the first electronic device 310 and the second electronic device 320. The first processor 314 may transmit a power control instruction to the second communication module 321 using the first communication module 311. The second processor 324 may perform power transfer between the first electronic device 310 and the second electronic device 320 in response to the power control instruction.

In operation 430, the electronic device 300 according to an embodiment may determine whether the first level is higher than the second level by a threshold value or more. The first processor 314 or the second processor 324 may be configured to have a specified threshold value. The first processor 314 or the second processor 324 may compare the first level with the second level. When the first level is higher than the second level, the first processor 314 or the second processor 324 may determine whether a value obtained by subtracting the second from the first level has a value greater than the threshold value.

When the first level is higher than the second level by the threshold value or more, in operation 440, the electronic device 300 according to an embodiment may transfer at least a portion of the power of the first battery 312 to the second electronic device 320 using the first power transfer module 315.

When the first level is not higher than the second level by the threshold value or more, in operation 450, the electronic device 300 according to an embodiment may determine whether the second level is higher than the second level by the threshold value or more. The first processor 314 or the second processor 324 may compare the first level with the second level. When the second level is higher than the second level, the first processor 314 or the second processor 324 may determine whether a value obtained by subtracting the first level from the second level has a value greater than the threshold value.

When the second level is higher than the first level by the threshold value or more, in operation 460, the electronic device 300 according to an embodiment may transfer at least a portion of the power of the second battery 322 to the second portion 310 using the second power transfer module 325.

In an embodiment, the first processor 314 or the second processor 324 may be configured to control a difference value between the first level and the second level to the threshold value or less. When the difference value between the first level and the second level is greater than or equal to the threshold value, the first processor 314 or the second processor 324 may be configured to deliver power from a portion with a high level to a portion with a low level to reduce the difference value between the first level and the second level. The first processor 314 or the second processor 324 may perform a balancing task for balancing a battery level between the first electronic device 310 and the second electronic device 320.

Figure 5:
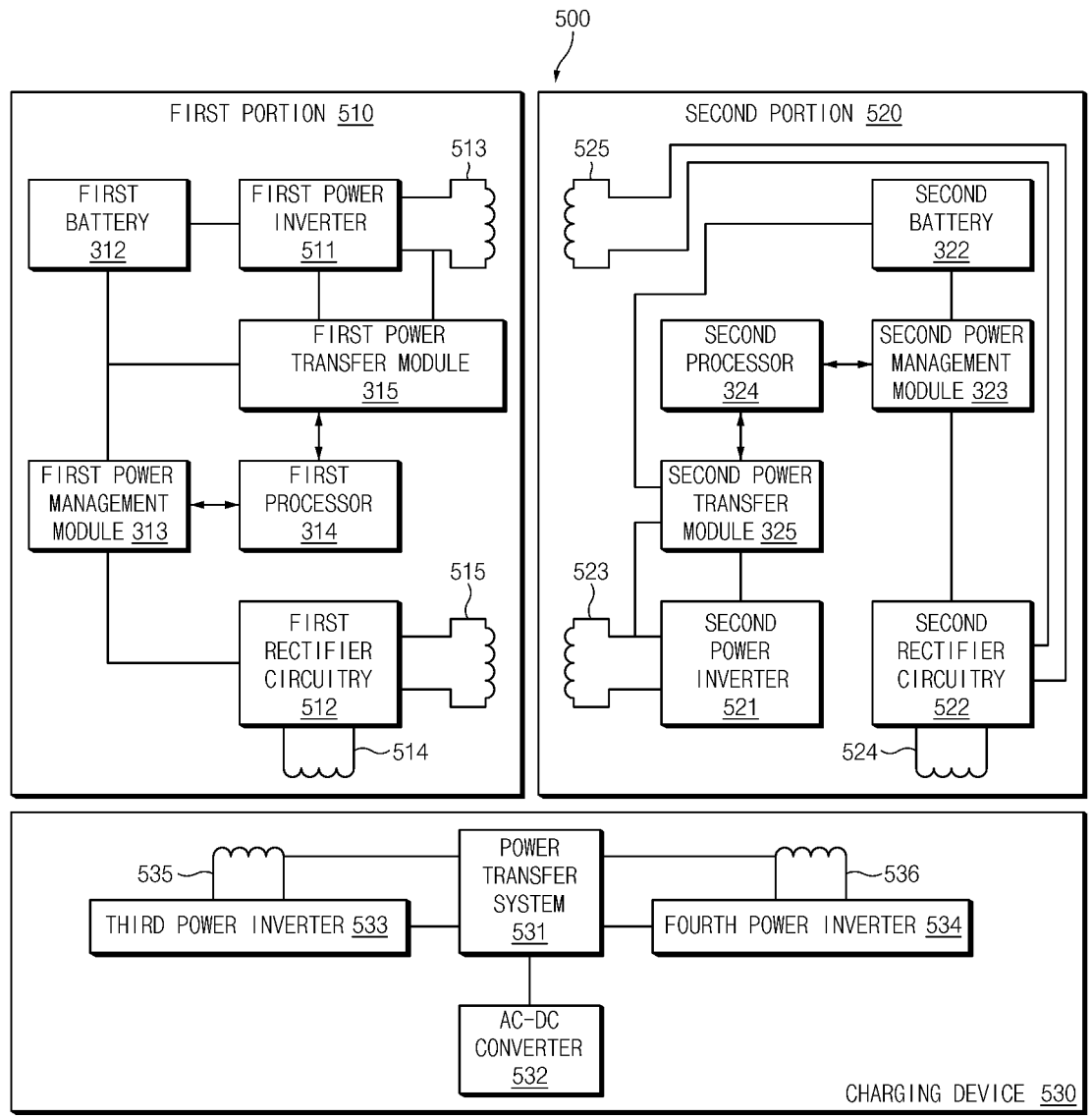
FIG. 5 is a block diagram illustrating a first portion, a second portion, and a charging device of an electronic device according to another embodiment.

FIG. 5 is a block diagram illustrating a first electronic device 510, a second electronic device 520, and a charging device 530 of an electronic device 500 according to another embodiment.

In an embodiment, the first electronic device 510 may include a first battery 312, a first power management module 313, a first processor 314, a first power transfer module 315, a first power inverter 511, a first rectifier circuitry 512, a first transmit coil 513, a first charging coil 514, and a first receive coil 515. Because configurations and functions of the first battery 312, the first power management module 313, the first processor 314, and the first power transfer module 315 are substantially the same as those of a first battery 312, a first power management module 313, a first processor 314, and a first power transfer module 315, described with reference to FIG. 3, hereinafter, a description duplicated by the components described with reference to FIG. 3 will be omitted.

In an embodiment, the second electronic device 520 may include a second battery 322, a second power management module 323, a second processor 324, a second power transfer module 325, a second power inverter 521, a second rectifier circuitry 522, a second transmit coil 523, a second charging coil 524, and a second receive coil 525. Because it is able for functions of the components constituting the second electronic device 520 to substantially the same as those of the components constituting the first electronic device 510, hereinafter, a description duplicated by the components described in the first electronic device 510 will be omitted.

In an embodiment, a charging device 530 may include a power transfer system 531, an alternating current (AC)-direct current (DC) converter 532, a third power inverter 533, a fourth power inverter 534, a third charging coil 535, and a fourth charging coil 536.

In an embodiment, the first power inverter 511 may be connected with the first battery 312, the second power transfer module 315, and the transmit coil 513. The first power inverter 511 may convert at least a portion of the power of the first battery 312 into transmissible AC current based on control of the first power transfer module 315. The first power inverter 511 may control AC current to flow in the first transmit coil 513.

In an embodiment, the first rectifier circuitry 512 may be connected with the first power management module 313, the first charging coil 514, and the first receive coil 515. The first rectifier circuitry 512 may convert AC current transmitted from the first charging coil 514 or the first receive coil 515 into power. The first rectifier circuitry 512 may deliver the converted power to the first power management module 313.

In an embodiment, the first transmit coil 513 may be connected with the first power transfer module 315 and the first power inverter 511. The first transmit coil 513 may receive at least a portion of the power of the first battery 312 from the first power transfer module 315 and the first power inverter 511. The first transmit coil 513 may be coupled with the second electronic device 520 in a magnetic induction mode. For example, the first transmit coil 513 may be coupled with the second receive coil 525 in the magnetic induction mode. The first transmit coil 513 may transmit at least a portion of the power of the first battery 312 to the second electronic device 520. The first power transfer module 315 may control the amount of power transmitted from the first transmit coil 513 or a transmission speed of the power transmitted from the first transmit coil 513. The power transmitted from the first transmit coil 513 may be delivered to the second rectifier circuitry 522 via the second receive coil 525.

In an embodiment, the first charging coil 514 may be connected with the first rectifier circuitry 512. The first charging coil 514 may be coupled with the charging device 530. For example, the first charging coil 514 may be coupled with the third charging coil 535. The first charging coil 514 may receive power from the charging device 530.

In an embodiment, the first receive coil 515 may be connected with the first rectifier circuitry 512. The first receive coil 515 may be coupled with the second portion. For example, the first receive coil 515 may be coupled with the second transmit coil 523. The first receive coil 515 may receive at least a portion of the power of the second battery 322 from the second electronic device 520.

In an embodiment, the power received in the first receive coil 515 may be delivered to the first battery 312 through the first rectifier circuitry 512 and the first power management module 313.

In an embodiment, the power transfer system 531 may be connected with the AC-DC converter 532, the third power inverter 533, the fourth power inverter 534, the third charging coil 535, and the fourth charging coil 536. The power transfer system 531 may control such that the third power inverter 533, the fourth power inverter 534, the third charging coil 535, and the fourth charging coil 536 charge the first electronic device 510 and the second electronic device 520 using the AC-DC converter 532.

In an embodiment, the AC-DC converter 532 may convert power supplied to the charging device 530 to be delivered to the first electronic device 510 and the second electronic device 520 using the third charging coil 535 and the fourth charging circuit 536.

In an embodiment, the third power inverter 533 may convert power transmitted from the power transfer system 531 into transmissible AC current such that the third charging coil 535 may charge the first electronic device 510. The third power inverter 533 may control AC current to flow in the third charging coil 535.

In an embodiment, the fourth power inverter 534 may convert power transmitted from the power transfer system 531 into transmissible AC current such that the fourth charging coil 536 may charge the second electronic device 520. The fourth power inverter 534 may control AC current to flow in the fourth charging coil 536.

In an embodiment, the third charging coil 535 may be connected with the third power inverter 533. The third charging coil 535 may be coupled with the first electronic device 510. For example, the third charging coil 535 may be coupled with the first charging coil 514. The third charging coil 535 may deliver power to the first electronic device 510 to charge the first battery 312. The power transfer system 531 may control the amount of power transmitted by the third charging coil 535 or a transmission speed of the power transmitted by the third charging coil 535.

In an embodiment, the fourth charging coil 536 may be connected with the fourth power inverter 534. The fourth charging coil 536 may be coupled with the second electronic device 520. For example, the fourth charging coil 536 may be coupled with the second charging coil 524. The fourth charging coil 536 may deliver power to the second electronic device 520 to charge the second battery 322. The power transfer system 531 may control the amount of power transmitted by the fourth charging coil 536 or a transmission speed of the power transmitted by the fourth charging coil 536.

Figure 6:
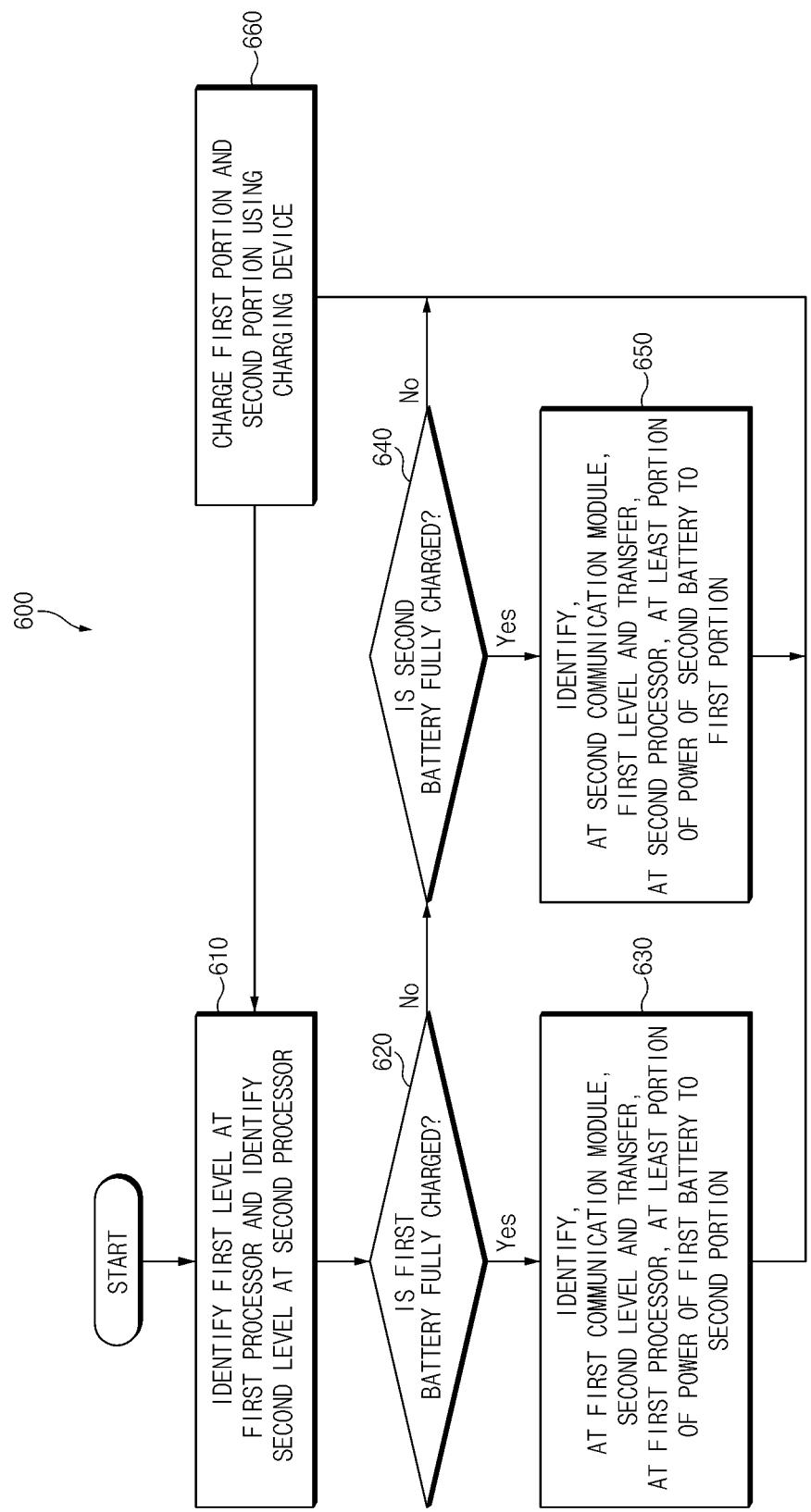
FIG. 6 is a flowchart illustrating a method for balancing a battery level between a first portion and a second portion of an electronic device according to another embodiment.

FIG. 6 is a flowchart 600 illustrating a method for balancing a battery level between a first electronic device 510 and a second electronic device 520 of an electronic device 500 according to another embodiment.

In operation 610, the electronic device 500 according to an embodiment may identify a first level at its first processor 314 and may identify a second level at its second processor 324. For example, at a specified time interval while the first electronic device 510 and the second electronic device 520 are charged using a charging device 530 of FIG. 5, the first processor 314 may identify the battery remaining capacity of the first electronic device 510 and the second processor 324 may identify the battery remaining capacity of the second electronic device 520.

In operation 620, the electronic device 500 according to an embodiment may determine whether a first battery 312 of FIG. 5 is fully charged. The first processor 314 may determine whether the first level is the maximum capacity of the first battery 312.

When the first battery 312 is fully charged, in operation 630, the electronic device 500 according to an embodiment may identify the second level which is the remaining capacity of a second battery 322 of FIG. 5 at its first communication module 311 and may transmit at least a portion of the power of the first battery 312 to the second electronic device 520 at the first processor 314 using a first power transfer module 315 of FIG. 5. When the first battery 312 is fully charged, power received in the first electronic device 510 in power transmitted from the charging device 530 may be transferred to the second electronic device 520. The electronic device 500 may be configured such that, when the battery 312 is fully charged, the first electronic device 510 transfers power to the second electronic device 520 to increase a speed at which the second battery 322 is charged.

Particularly, because the charging device 530 maintains a state where it transfers power to the first electronic device 510, the first electronic device 510 may use power charged in the first battery 312 or may transfer power to the second electronic device 520 without discharging the first battery 312. Thus, the electronic device 500 according to an embodiment may reduce a time taken until the second battery 322 is charged at the same that the first battery 312 maintains a fully charged state.

When the first battery 312 is not fully charged, in operation 640, the electronic device 500 according to an embodiment may determine whether the second battery 322 is fully charged. The second processor 324 may determine whether the second level is the maximum capacity of the second battery 322.

When the second battery 322 is fully charged, in operation 650, the electronic device 500 according to an embodiment may identify the first level which is the remaining capacity of the first battery 312 at its second communication module 321 and may transmit at least a portion of the power of the second battery 322 to the first electronic device 510 at the second processor 324 using a second power transfer module 325 of FIG. 5. When the second battery 322 is fully charged, power received in the second electronic device 520 in power transferred from the charging device 530 may be transferred to the first electronic device 510. The electronic device 500 may be configured such that, when the second battery 322 is fully charged, the second electronic device 520 transfers power to the first electronic device 510 to increase a speed at which the second battery 312 is charged. Particularly, because the charging device 530 maintains a state where it transfers power to the second electronic device 520, the second electronic device 520 may use power charged in the second battery 322 or may transfer power to the first electronic device 510 without discharging the second battery 322. Thus, the electronic device 500 may reduce a time taken until the first battery 312 is charged at the same time that the second battery 322 maintains a fully charged state.

It is noted that after operation 630, the first electronic device 510 which may have been fully charged at 620 is unlikely to be fully charged after transferring at least the portion of power to the second electronic device 520. Similarly, after operation 650, the second electronic device 520 which may have been fully charged at 640 is unlikely to be fully charged after transferring at least the portion of power to the first electronic device 510. In operation 660, the electronic device 500 according to an embodiment may charge the first electronic device 510 and the second electronic device 520 using the charging device 530. At a specified time interval while the electronic device 500 charges the first electronic device 510 and the second electronic device 520, the first processor 314 may identify the first level and the second processor 324 may identify the second level. The electronic device 500 may charge the first electronic device 510 and the second electronic device 520 until both the first battery 312 and the second battery 322 are fully charged. Upon charging, the electronic device 500 may perform a balancing task for balancing a battery level between the first electronic device 510 and the second electronic device 520. Furthermore, because it is able for the electronic device 500 to transfer power depending on a charging situation between the first electronic device 510 and the second electronic device 520, the electronic device 500 may reduce a time taken for all the plurality of portions 510 and 520 to be charged.

Figure 7:
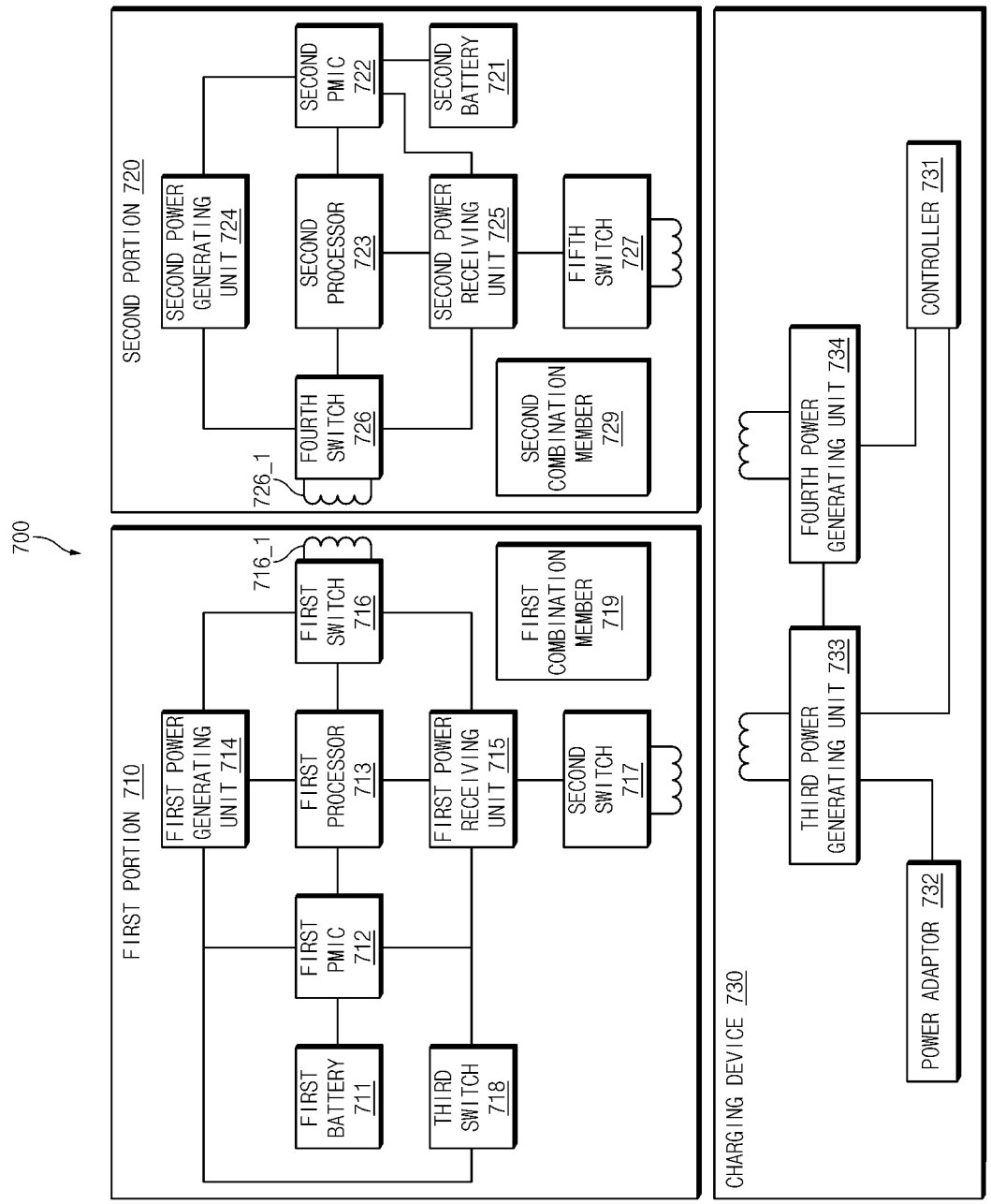
FIG. 7 is a block diagram illustrating a first portion, a second portion, and a charging device of an electronic device according to another embodiment.

FIG. 7 is a block diagram illustrating a first electronic device 710, a second electronic device 720, and a charging device 730 of an electronic device 700 according to another embodiment. The first electronic device 710 may include a first battery 711, a first power management integrated circuit (PMIC) 712, a first processor 713, a first power generating unit 714, a first power receiving unit 715, a first switch 716 controlling a first power transmission coil 716-1, a second switch 717, a third switch 718, and a first combination member 719. Functions of the first battery 711, the first PMIC 712, the first processor 713, the first power generating unit 714, and the first power receiving unit 715 may be substantially the same as those of a first battery 312, a first power management module 313, a first processor 314, and a first transfer module 315, described with reference to FIG. 3, and those of a first power inverter 511 and a first rectifier circuitry 512, described with reference to FIG. 5. Thus, hereinafter, a description of duplicated components and functions will be omitted.

In an embodiment, the second electronic device 720 may include a second battery 721, a second PMIC 722, a second processor 723, a second power generating unit 724, a second power receiving unit 725, a fourth switch 726 controlling a second power transmission coil 726-1, a fifth switch 727, and a second combination member 729. Functions of the components constituting the second electronic device 720 may be substantially the same as those of the components constituting the first electronic device 710. Thus, hereinafter, a description of duplicated components and functions will be omitted.

In an embodiment, the charging device 730 may include a controller 731, a power adaptor 732, a third power generating unit 733, and a fourth power generating unit 734. The controller 731, the power adaptor 732, the third power generating unit 733, and the fourth power generating unit 734 may be substantially the same as a power transfer system 531, an AC-DC converter 532, a third power inverter 533, a fourth power inverter 534, a third charging coil 535, and a fourth charging coil 536, described with reference to FIG. 5. Thus, hereinafter, a description of duplicated components and functions will be omitted.

In an embodiment, the first PMIC 712 may be connected with the first battery 711, the first processor 713, the first power generating unit 714, and the first power receiving unit 715. The first PMIC 712 may receive power charged in the first electronic device 710 by the charging device 730 from the first power receiving unit 715. The first PMIC 712 may charge the first battery 711 using the received power. The first PMIC 712 may deliver the received power to the first power generating unit 714.

In an embodiment, the first switch 716 may control the first power transmission coil 716_1 (e.g., a first transmit coil 513 of FIG. 5). The first switch 716 may be connected with the first processor 713, the first power generating unit 714, and the first power receiving unit 715. The first switch 716 may selectively deliver an AC form of power, transmitted at the first power generating unit 714 from the first battery 711, to the second electronic device 720 using the power transmission coil 716_1 by selectively forming a closed circuit (short) or open circuit. For example, the first switch 716 may deliver power to the fourth switch 726 using the power transmission coil 716_1.

In an embodiment, the first power generating unit 714 may be included in the first power transfer module 315 described with reference to FIG. 3. Describing it with reference to FIGS. 3 and 7, the first switch 716 may be disposed between the first power transfer module 315 and the first power transmission coil 716_1. When transmitting at least a portion of the power of the first battery 711 to the second electronic device 720, the first switch 716 may connect (short) the first power transfer module 315 and the first power transmission coil 716_1.

In an embodiment, the second switch 717 may control a charging coil (e.g., a first charging coil 514 of FIG. 5). The second switch 717 may be connected with the first power receiving unit 715. The second switch 717 may selectively deliver power by connecting (shorting) or disconnecting (open circuit) the first power receiving unit 715 to the coil, delivered from a charging device 530 of FIG. 5 to the charging coil 514, to the first power receiving unit 715. For example, when it is necessary to charge the first battery 711, the second switch 717 may deliver power, delivered from the charging device 530 to the charging coil 514, to the first power receiving unit 715. For another example, when the first battery 711 is fully charged, the first power receiving unit 715 may be disconnected from the charging device 730 using the second switch 717.

In an embodiment, the first power receiving unit 715 may be connected with the first PMIC 712, the first processor 713, the first switch 716, the second switch 717, and the third switch 718. The first power receiving unit 715 may receive power from the second switch 717 under control of the first processor 713. The first power receiving unit 715 may deliver the received power to the first PMIC 712. The first power receiving unit 715 may deliver the received power to the first power generating unit 714 using the third switch 718. The first power receiving unit 715 may deliver the received power to the second electronic device 720 using the first switch 716.

In an embodiment, the third switch 718 may be disposed between the first power generating unit 714 and the first power receiving unit 715. When the first electronic device 710 is charged, the third switch 718 may deliver power (closing or shorting a circuit), delivered from the charging device 730 to the first power receiving unit 715, to the first power generating unit 714.

In an embodiment, the first combination member 719 may be formed at at least a portion of an edge region of the first electronic device 710. The first combination member 719 may allow the first electronic device 710 to be selectively combined or separated from the second electronic device 720. The first combination member 719 may be a removable member. For example, the first combination member 719 may be implemented as a magnet member.

In an embodiment, the second power receiving unit 715 may be connected with the second PMIC 722, the second processor 723, the fourth switch 726, and the fifth switch 727. The second power receiving unit 725 may receive power from the fifth switch 727 under control of the second processor 723. The second power receiving unit 725 may deliver the received power to the second PMIC 722. The second power receiving unit 725 may deliver the received power to the first electronic device 710 using the fourth switch 726.

In an embodiment, the fourth switch 726 may include the second power transmission coil 726_1 (e.g., a second transmit coil 525 of FIG. 5). The fourth switch 726 may be connected with the second processor 723 and the second power generating unit 724. The fourth switch 726 may deliver power to the first electronic device 710 using the second power transmission coil 726_1.

In an embodiment, the fifth switch 727 may include a charging coil (e.g., a second charging coil 524 of FIG. 5). The fifth switch 727 may selectively deliver power, delivered from the charging device 530 to the charging coil 524, to the second power receiving unit 725.

In an embodiment, the second combination member 729 may be formed at at least a portion of an edge region of the second electronic device 720. The second combination member 729 may allow the second electronic device 720 to be selectively combined or separated from the first electronic device 710. The second combination member 729 may be a removable member. For example, the second combination member 729 may be implemented as a magnet member.

Figure 8:
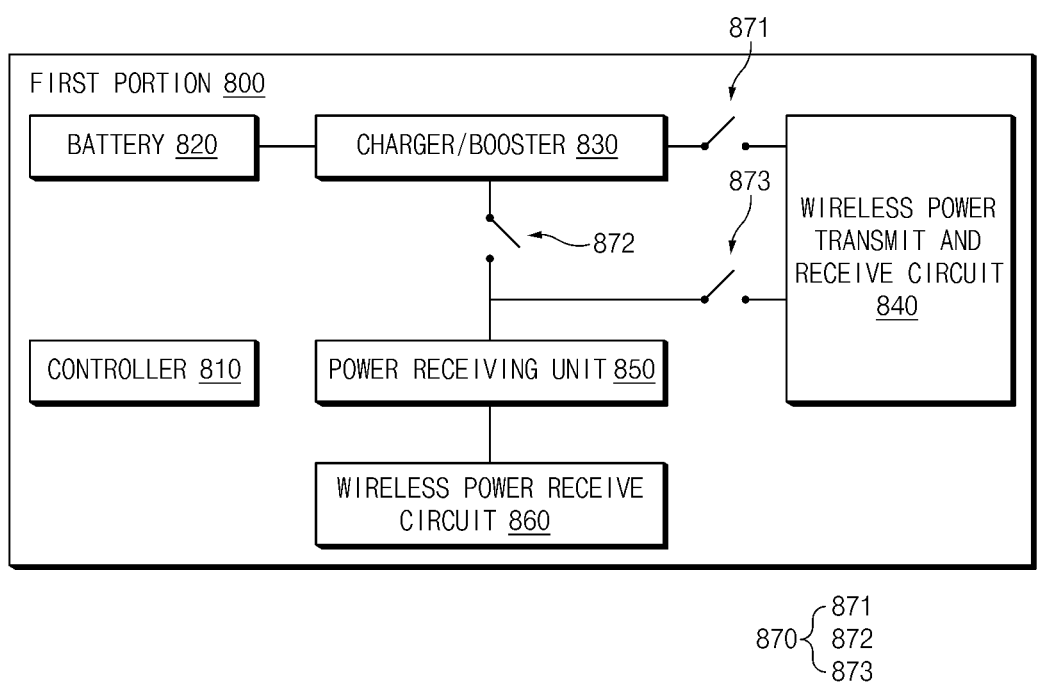
FIG. 8 is a block diagram illustrating a first portion of an electronic device according to another embodiment.

FIG. 8 is a block diagram illustrating a first electronic device 800 of an electronic device according to another embodiment. The first electronic device 800 may include a controller 810, a battery 820, a charger/booster 830, a wireless power transmit and receive circuit 840, a power receiving unit 850, a wireless power receive circuit 860, and a switching unit 870. The switching unit 870 may include first to third switch elements 871 to 873. The controller 810, the battery 820, the charger/booster 830, the wireless power transmit and receive circuit 840, the power receiving unit 850, and the wireless power receive circuit 860 may be substantially the same as a first battery 711, a first PMIC 712, a first processor 713, a first power generating unit 714, and a first power receiving unit 715, described with reference to FIG. 7. Hereinafter, a description of duplicated components and functions will be omitted.

In an embodiment, the first switch element 871 may selectively connect the charger/booster 830 and the wireless power transmit and receive circuit 840. For example, when transferring at least a portion of the power of the battery 820 from the first electronic device 800 to a second portion (e.g., a second electronic device 720 of FIG. 7), the first switch element 871 may deliver the at least portion of the power of the battery 820 to the wireless power transmit and receive circuit 840 using the charger/booster 830. The wireless power transmit and receive circuit 840 may deliver power to the second electronic device 720.

In an embodiment, the second switch element 872 may selectively connect the charger/booster 830 and the power receiving unit 850. For example, when the first electronic device 800 is charged using a charging device (e.g., a charging device 730 of FIG. 7), the second switch element 872 may deliver power, transmitted to the power receiving unit 850, to the charger/booster 830. The charger/booster 830 may charge the battery 820.

In an embodiment, the third switch 873 may selectively connect the wireless power transmit and receive circuit 840 and the power receiving unit 850. For example, when power is delivered to the second electronic device 720 at the same that the first electronic device 800 is charged using the charging device 730, the third switch 873 may transfer power, transmitted to the power receiving unit 850, to the wireless power transmit and receive circuit 840. The wireless power transmit and receive circuit 840 may deliver power to the second electronic device 720.

Figure 9:
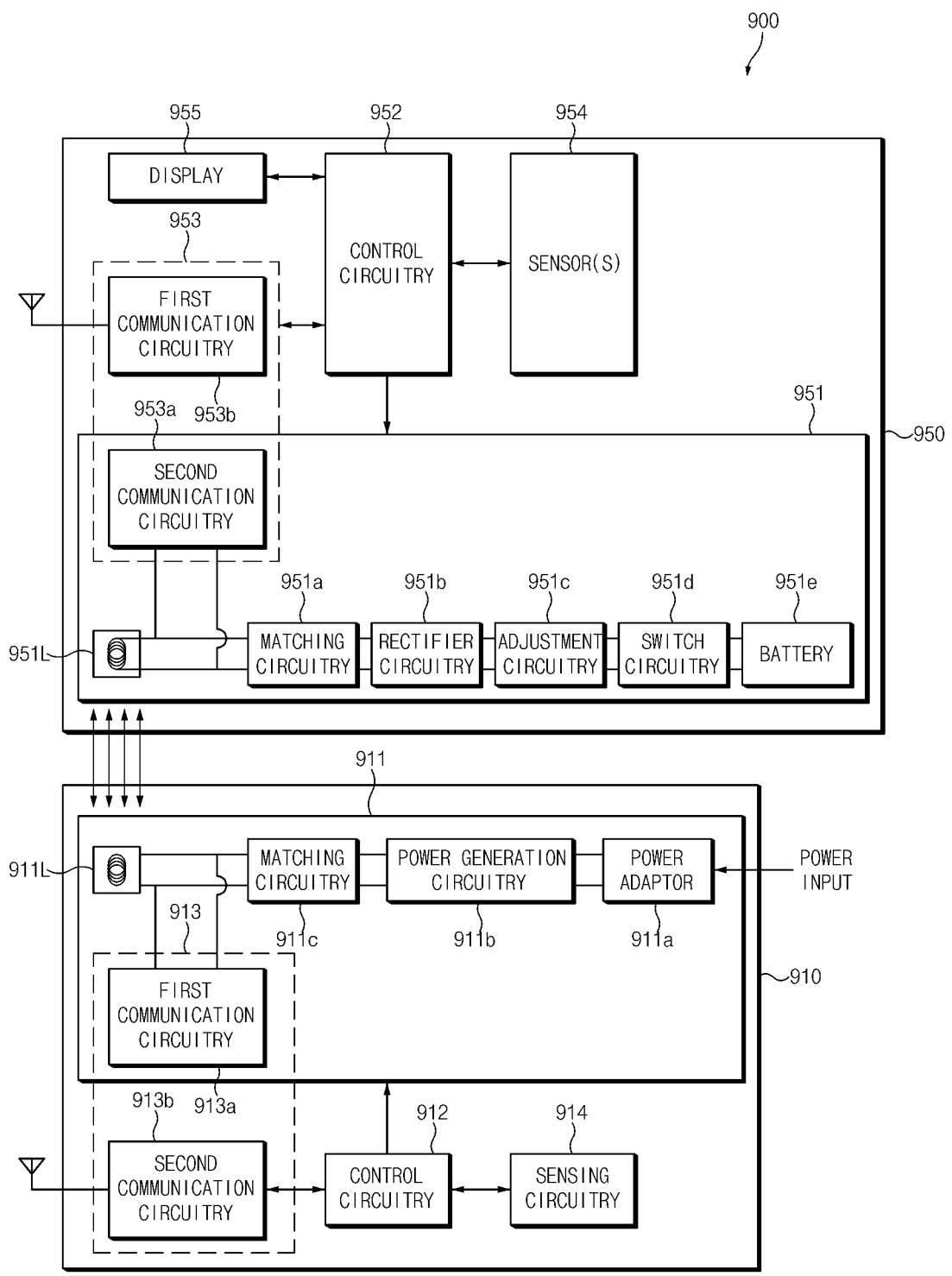
FIG. 9 is a block diagram illustrating a first portion and a charging device of an electronic device according to another embodiment.

FIG. 9 is a block diagram illustrating a first electronic device 950 and a charging device 910 of an electronic device 900 according to another embodiment.

In an embodiment, the first electronic device 950 may be understood as an electronic device which supports wireless charging, and the charging device 910 may be understood as an electronic device capable of wirelessly supplying power. In the disclosure, the charging device 910 may be referred to as a power transmitting unit or a PTU, and the first electronic device 950 may be referred to as a power transmitting unit or a PRU. The charging device 910 may be connected with any power source to supply power to the first electronic device 950.

In an embodiment, the charging device 910 may include a power generation circuitry, a control circuitry 912, a communication circuitry, and a sensing circuitry 914.

In an embodiment, the power generation circuitry 911 may include a power adaptor 911a for receiving power from the outside and suitably converting a voltage of the input power, a power generation circuitry 911b for generating power, and a matching circuit 911c for optimizing efficiency between a transmit coil 911L and a receive coil 951L.

In an embodiment, the control circuitry 912 may perform overall control of the charging device 910 and may generate various messages necessary for wireless power transmission to deliver the generated messages to the communication circuitry 913. The control circuitry 912 may calculate the amount of power to be transmitted to the first electronic device 950, based on information received from the communication circuitry 913. The control circuitry 912 may control the power generation circuitry 913 to transfer power calculated by the transmit coil 911L to the first electronic device 950.

In an embodiment, the communication circuitry 913 may include at least one of a first communication circuitry 913a and a second communication circuitry 913b. The first communication circuitry 913a may communicate with a first communication circuitry 952a of the first electronic device 950 using the transmit coil 911L used for power delivery (e.g., an in-band manner). The second communication circuitry 913b may communicate with a second communication circuitry 953b of the first electronic device 950 using, for example, an antenna or coil different from the transmit coil 911L used for power delivery (e.g., an out-band manner). For example, the second communication circuitry 913b may obtain information (e.g., Vrec information, Iout information, various packets, or a message) associated with a charging state from the second communication circuitry 953b using any one of various short-range communication modes such as Bluetooth, BLE, Wi-Fi, and NFC.

In an embodiment, the sensing circuitry 914 may detects a temperature, motion, or the like of the charging device 910.

In an embodiment, the first electronic device 950 may include a power receive circuit 951, a control circuitry 952, a communication circuitry 953, at least one sensor 954, and a display 955. In the first electronic device 950, a description of a configuration corresponding to the configuration of the charging device 910 will be partially omitted.

In an embodiment, the power receive circuit 951 may include the receive coil 951L for wirelessly receiving power from the charging device 910, a matching circuitry 951a, a rectifier circuitry 951b for rectifying received AC power into DC, an adjustment circuitry 951c for adjusting a charging voltage, a switch circuitry 951d, and a battery 951e.

In an embodiment, the control circuitry 952 may perform overall control of the first electronic device 950 and may generate various messages necessary wireless power transmission to deliver the generated messages to the communication circuitry 953.

In an embodiment, the communication circuitry 953 may include at least one of the first communication circuitry 953a and the second communication circuitry 953b. The first communication circuitry 953a may communicate with the charging device 910 via the receive coil 951L. The second communication circuitry 953b may communicate with the charging device 910 using any one of various short-range communication modes such as Bluetooth, BLE, Wi-Fi, and NFC.

In an embodiment, the at least one sensor 954 may include a current/voltage sensor, a temperature sensor, an illumination sensor, or a sound sensor. The display 955 may visually display information about the battery remaining capacity of the first portion 910.

Figure 10A:
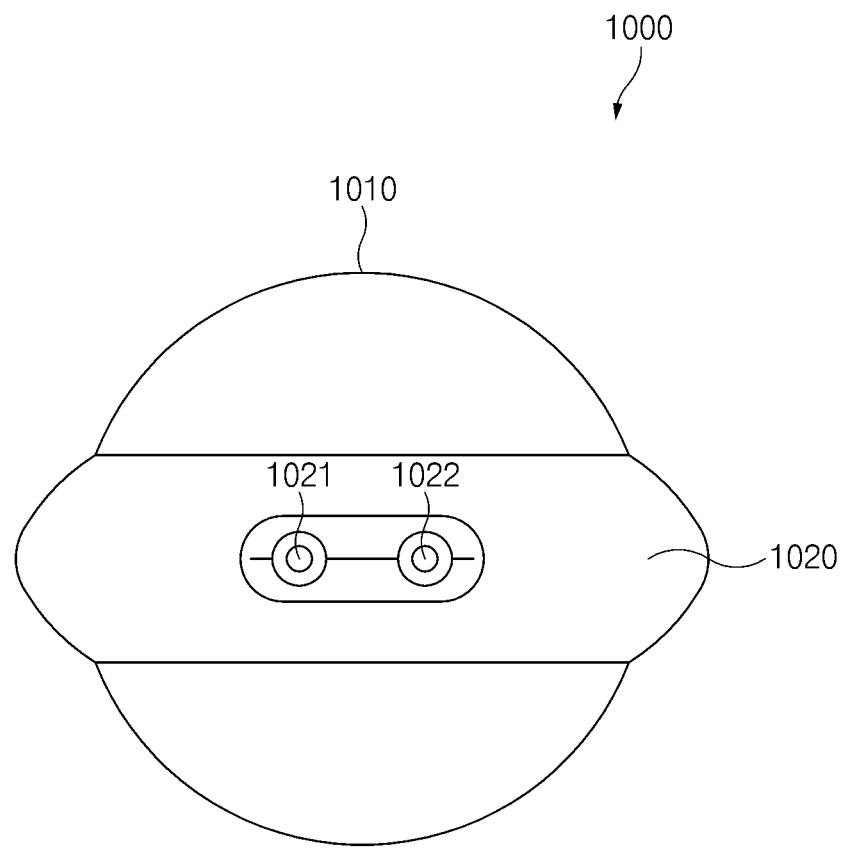
FIG. 10A is a drawing illustrating a first portion and a second portion of an electronic device according to an embodiment.
Figure 10B:
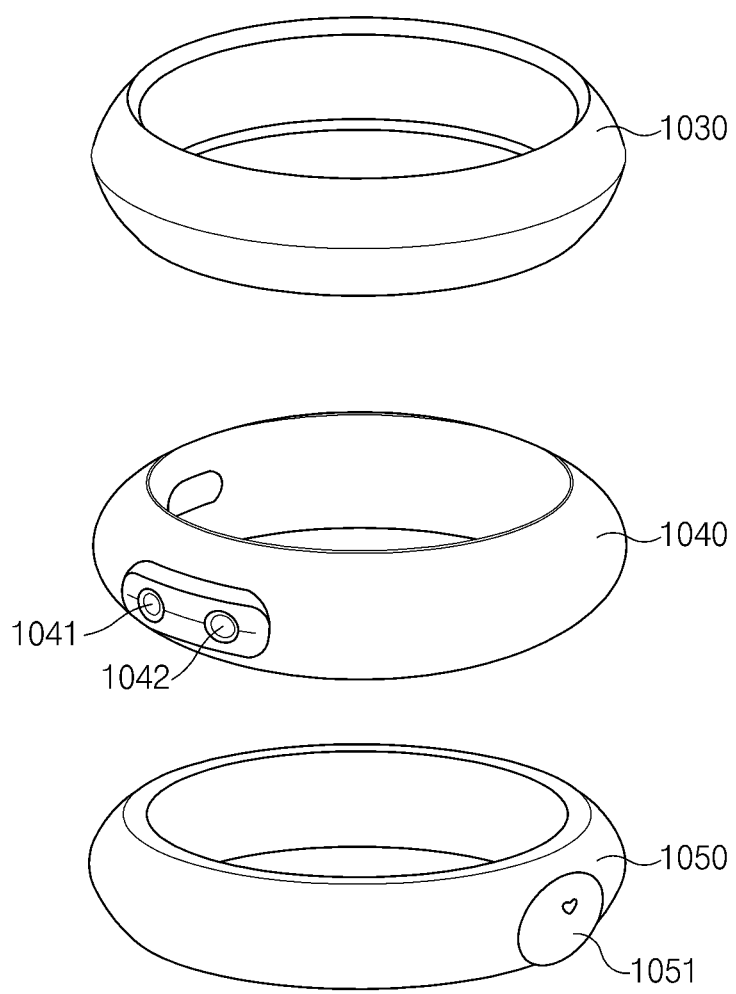
FIG. 10B is a drawing illustrating second portions of an electronic device according to various embodiments.

FIG. 10A is a drawing illustrating an apparatus comprising a first electronic device 1010 and a second electronic device 1020. FIG. 10B is a drawing illustrating second electronic devices 1030, 1040, and 1050 of an apparatus 1000 according to various embodiments.

In an embodiment, the first electronic device 1010 and the second electronic device 1020 may be detachably connected using a combination member (e.g., a first combination member 719 and a second combination member 729 of FIG. 7) which uses a magnet. The first electronic device 1010 and the second electronic device 1020 may be operated or charged in a state where they are combined with each other. The first electronic device 1010 and the second electronic device 1020 may perform wireless communication in a state where they are combined with each or where they are separated from each other.

In an embodiment, the first electronic device 1010 may have a ball shape, and the second electronic device 1010 may have a ring shape which surrounds the first electronic device 1010. When the first electronic device 1010 has a spherical shape, the second portion 1010 may have a ring shape which covers a cross-sectional circle passing through a central portion of the first electronic device 1010. For example, the first electronic device 1010 may be a driving portion for controlling a movement or arrangement state of the electronic device 1000, and the second electronic device 1010 may be a data processing portion capable of sensing an external environment and state by means of a sensor 1021 and a camera 1022 and performing driving and calculation using the sensed data.

In an embodiment, the second electronic device 1030, 1040, and 1050 may have various shapes and functions. The second electronic device 1030 which has no complex function, the second electronic device 1040 having a sensor 1041 and a camera 1042, and the second function 1050 having a display unit 1051 may be selectively combined with the first electronic device 1010.

Figure 11A:
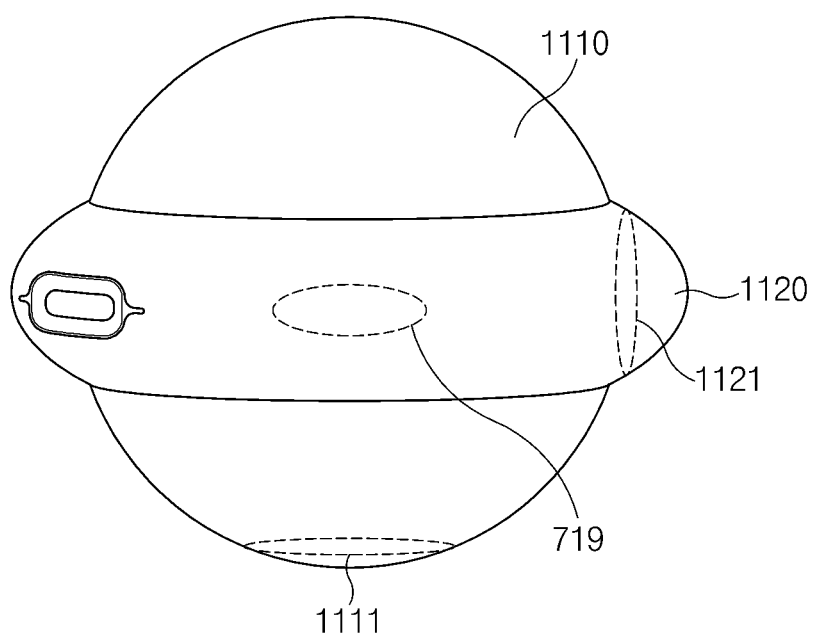
FIG. 11A is a drawing illustrating a first portion and a second portion of an electronic device according to an embodiment.
Figure 11B:
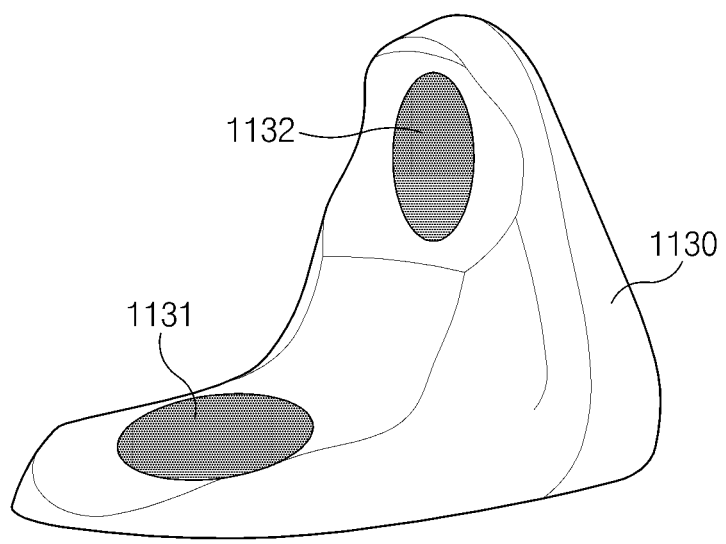
FIG. 11B is a drawing illustrating a charging device of an electronic device according to an embodiment.
Figure 11C:
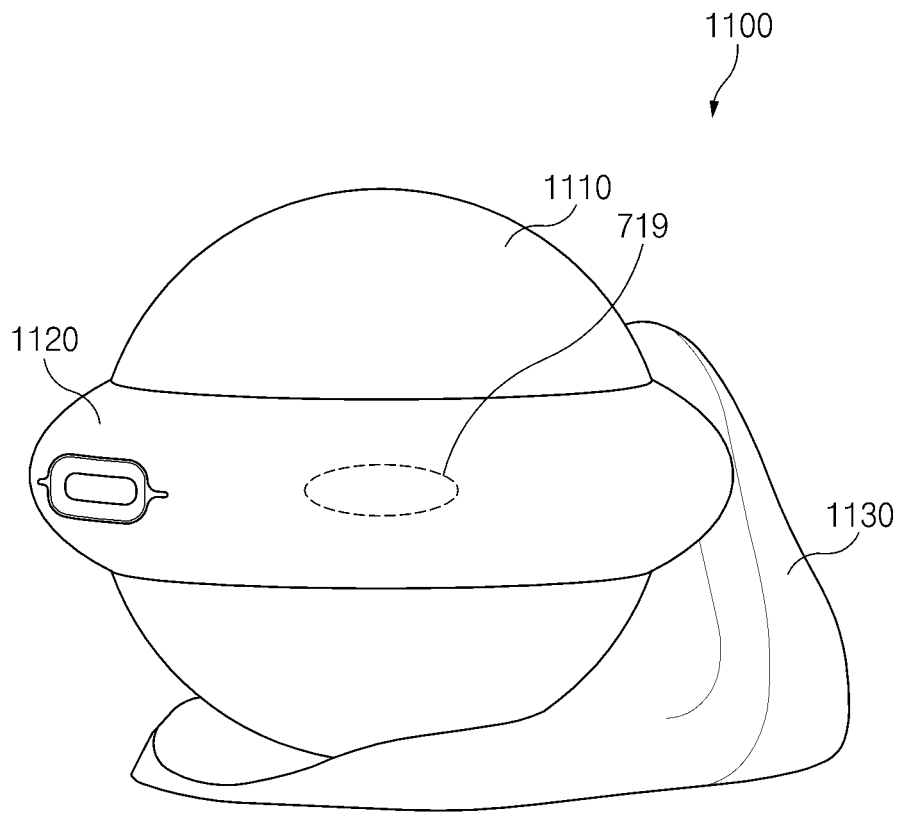
FIG. 11C is a drawing illustrating a first portion, a second portion, and a charging device of an electronic device according to an embodiment.

FIG. 11A is a drawing illustrating an apparatus including a first electronic device 1110 and a second electronic device 1120. FIG. 11B is a drawing illustrating a charging device 1130 of an electronic device 1100 according to an embodiment. FIG. 11C is a drawing illustrating a first electronic device 1110, a second electronic device 1120, and a charging device 1130 of an electronic device 1100 according to an embodiment.

In an embodiment, the first electronic device 1110 may include a first charging coil 1111. For example, the first charging coil 1111 may be disposed in at least a portion of an outer edge region of the first electronic device 1110.

In an embodiment, the first electronic device 1110 may include a first combination member (e.g., a first combination member 719 of FIG. 7). For example, the first combination member 719 may be formed on at least a portion of a portion overlaid with a second electronic device 1120 in a surface of the first electronic device 1110. The first combination member 719 may enable the second electronic device 1120 to be selectively combined or separated from the first electronic device 1110.

In an embodiment, the second electronic device 1120 may include a second charging coil 1121. For example, the second charging coil 1121 may be disposed in at least a portion of an outer edge region of the second electronic device 1120.

In an embodiment, the second electronic device 1120 may include a second combination member (e.g., a second combination member 729 of FIG. 7). For example, the second combination member 729 may be formed in a portion corresponding to the first combination member 719 in a surface of the second electronic device 1120. The second combination member 729 may enable the second electronic device 1120 to detach from the first electronic device 1110.

In an embodiment, the first electronic device 1110 and the second electronic device 1120 may be mounted on the charging device 1130. The charging device 1130 may include a third charging coil 1131 and a fourth charging coil 1132. For example, the third charging coil 1131 may be disposed in at least a portion of a region where the first electronic device 1110 is mounted on the charging device 1130 and is in contact with the charging device 1130. The fourth charging coil 1132 may be disposed in at least a portion of a region where the second electronic device 1120 is mounted on the charging device 1130 and is in contact with the charging device 1130.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may include a structure capable of sharing power among the plurality of portions.

According to embodiments disclosed in the disclosure, the electronic device may more easily control the amount of power consumed by each of the plurality of portions.

According to embodiments disclosed in the disclosure, the electronic device may delay a time when a portion which is fully discharged among the plurality of portions occurs, thus increasing a time when the electronic device is used.

According to embodiments disclosed in the disclosure, the electronic device may reduce a time taken until the plurality of portions included in the electronic device are fully charged.

In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first electronic device, comprising:
a first communication module;
a first battery configured to supply power to the first electronic device;
a first power management module connected and configured to control the first battery;
a first power transfer module; and
a first processor operationally connected with the first communication module, the first power management module, and the first power transfer module,
wherein the first communication module is configured to identify a remaining capacity of a second battery in a second electronic device, and
wherein the first processor is configured to:
when a remaining capacity of the first battery is greater than the remaining capacity of the second battery by greater than or equal to a specified threshold value, transfer at least a portion of the power of the first battery to the second electronic device using the first power transfer module,
wherein the first communication module is configured to indicate the remaining capacity of the first battery to the second electronic device, and
wherein, when the remaining capacity of the second battery in the second electronic device is higher than the remaining capacity of the first battery by the threshold value or more, the first power management module is configured to receive a predetermined portion of power from the second battery.

2. The first electronic device of claim 1, wherein the first electronic device further comprises a first transmit coil connected with the first power transfer module,
wherein the first transmit coil is configured to magnetically induce power to a second coil in the second electronic device.

3. The first electronic device of claim 2, wherein the first electronic device further comprises a first switch disposed between the first power transfer module and the first transmit coil, and
wherein, when transmitting the at least portion of the power of the first battery to the second electronic device, the first switch connects the first power transfer module and the first transmit coil.

4. The first electronic device of claim 1, further comprising:
a first power receiving unit configured to engage in magnetic induction with a charger to charge the first battery.

5. The first electronic device of claim 1, wherein the first processor is configured to control specified threshold.

6. The first electronic device of claim 1, wherein the first electronic device is detachably connected with the second electronic device by a magnetic member,
wherein the first electronic device has a ball shape, and
wherein the second electronic device has a ring shape which surrounds the first electronic device.

7. A first electronic device, comprising:
a first communication module;
a first battery configured to supply power to the first electronic device;
a first power management module configured to control the first battery;
a first power transfer module; and
a first processor operationally connected with the first communication module, the first power management module, and the first power transfer module,
wherein, when the first battery is fully charged, the first communication module is configured to identify a remaining capacity of a second battery in a second electronic device and the first processor is configured to transfer at least a portion of the power of the first battery to the second electronic device using the first power transfer module,
wherein the first communication module is configured to indicate a remaining capacity of the first battery to the second electronic device, and
wherein, when the first battery is not fully charged, and when the remaining capacity of the second battery in the second electronic device is higher than the remaining capacity of the first battery by a threshold value or more, the first power management module is configured to receive a predetermined portion of power from the second battery.

8. The first electronic device of claim 7, further comprising a first transmit coil connected with the first power transfer module,
wherein the first transmit coil is configured to engage in magnetic induction.

9. The first electronic device of claim 8, further comprising a first switch disposed between the first power transfer module and the first transmit coil, and
wherein, when transmitting the at least the portion of the power of the first battery, the first switch connects the first power transfer module and the first transmit coil.

10. The first electronic device of claim 7, further comprising:
a first power receiving unit configured to receive power wirelessly from a charger and configured to charge the first battery.

11. The first electronic device of claim 10, wherein, when the first battery and the second battery are fully charged, the first power receiving unit is disconnected from a charging device.

12. The first electronic device of claim 7, wherein the first processor is configured to control the threshold value.

13. The first electronic device of claim 7, further comprising a magnet and detachably connected to the second electronic device by the magnet,
wherein the first electronic device has a ball shape, and
wherein the second electronic device has a ring shape which surrounds the first electronic device.

14. An apparatus, comprising:
a first electronic device; and
a second electronic device detachably connected with at least a partial region of the first electronic device,
wherein the first electronic device includes:
a first combination member;
a first coil;
a first communication module;
a first battery configured to supply power to the first electronic device;
a first power transfer module configured to transfer at least a portion of the power of the first battery to the second electronic device;

a first power reception module configured to receive power from the second electronic device and charge the first battery; and a first processor operationally connected with the first communication module, the first power reception module, and the first power transfer module, wherein the second electronic device includes:

a second combination member;

a second coil;

a second communication module;

a second battery configured to supply power to the second electronic device;

a second power transfer module configured to transfer at least a portion of the power of the second battery to the first electronic device;

a second power reception module configured to receive power from the first electronic device and charge the second battery; and a second processor operationally connected with the second communication module, the first power transfer module, and the second power reception module, wherein the second electronic device is combined with the at least partial region of the first electronic device using the first combination member and the second combination member, and the first coil and the second coil are disposed adjacent to each other, and wherein the first processor or the second processor is configured to:

identify a first level which is remaining capacity of the first battery and a second level which is remaining capacity of the second battery; and when the first level is greater than the second level by greater than or equal to a specified threshold value, transfer the at least portion of the power of the first battery to the second electronic device using the first power transfer module, the first coil, and the second coil, wherein the first communication module is configured to indicate the first level to the second electronic device, and wherein, when the second level is greater than the first level by the threshold value or more, the first power reception module is configured to receive a predetermined portion of power from the second battery.

15. The apparatus of claim 14, wherein the first coil and the second coil are coupled in a magnetic induction mode.

16. The apparatus of claim 15, wherein the first electronic device further includes a first switch disposed between the first power transfer module and the first coil, wherein the second electronic device further includes a second switch disposed between the second power transfer module and the second coil, wherein, when transmitting the at least portion of the power of the first battery to the second electronic device, the first switch connects the first power transfer module and the first coil, and wherein, when transmitting the at least portion of the power of the second battery to the first electronic device, the second switch connects the second power transfer module and the second coil.

17. The apparatus of claim 14, wherein the first communication module or the second communication module is configured to:

identify the first level and the second level; and transfer the at least portion of the power of the first battery to the second electronic device using the first coil and the second coil or transfer the at least portion of the power of the second battery to the first electronic device using the second power transfer module, the first coil, and the second coil by communicating in an in-band manner.

18. The apparatus of claim 14, wherein the first communication module or the second communication module is configured to:

identify the first level and the second level; and transfer the at least portion of the power of the first battery to the second electronic device using the first power transfer module or transfer the at least portion of the power of the second battery to the first electronic device using the second power transfer module by communicating in an out-band manner.

* * * * *